United States Patent [19]
Dixson et al.

[11] 3,980,756
[45] Sept. 14, 1976

[54] AIR POLLUTION CONTROL SYSTEM
[75] Inventors: Donn Lewis Dixson, Granby; Carl Richard Bozzuto, Enfield, both of Conn.
[73] Assignee: Combustion Engineering, Inc., Windsor, Conn.
[22] Filed: Jan. 28, 1974
[21] Appl. No.: 437,455

[52] U.S. Cl. .............................. 423/242; 423/166
[51] Int. Cl.² .......................................... C01B 17/00
[58] Field of Search .......................... 423/242–244, 423/166

[56] References Cited
UNITED STATES PATENTS

| | | | |
|---|---|---|---|
| 2,080,779 | 5/1937 | Lessing | 423/242 |
| 3,411,864 | 11/1968 | Pallinger | 423/242 |
| 3,556,722 | 1/1971 | Owaki | 423/242 |
| 3,775,532 | 11/1973 | Shah | 423/242 |

*Primary Examiner*—Oscar R. Vertiz
*Assistant Examiner*—Gregory A. Heller
*Attorney, Agent, or Firm*—Richard H. Berneike

[57] ABSTRACT

Gases containing $SO_2$ from a furnace are contacted in the scrubbing zone of a scrubber with an aqueous scrubbing medium containing solid alkaline earth metal carbonate, seed crystals of alkaline earth metal sulfate and dissolved alkaline earth metal carbonate and sulfate and having a pH of from 6.0 to 6.5. The $SO_2$ reacts to form sulfites and bisulfites. The scrubbing medium is then withdrawn from the scrubbing zone and discharged to a reaction tank. Air is blown through the scrubbing medium in the reaction tank and then up into and through the scrubber and scrubbing zone. The oxygen reacts with sulfite to form sulfate in both the reaction tank and the scrubbing zone. The amount of oxygen is controlled so that the pH in the scrubber will not drop below about 4.5 and so as to oxidize not more than about 30 to 50% of the sulfite. Fresh additives in the form of alkaline earth metal carbonate or alkaline earth metal oxide which has been formed by calcining alkaline earth metal carbonate in the furnace is also introduced into the reaction tank and the pH returned to 6.0 to 6.5. A portion of the medium from the reaction tank is returned to the scrubbing zone and the remainder is further treated with oxygen to convert the remaining sulfite to sulfate which is precipitated and separated from the liquid. The liquid is then returned to the scrubbing cycle.

7 Claims, 3 Drawing Figures

AIR POLLUTION CONTROL SYSTEM

BACKGROUND OF THE INVENTION

The discharge of pollutants into the atmosphere has become of increasing concern as the rate of discharge increases and as the level of pollutants in the atmosphere increases. One of the sources of air pollution is the sulfur oxides and particulate matter which are discharged with the flue gases during the combustion of sulfur-containing fuels. A number of systems have been developed or proposed to remove the sulfur oxides and particulate matter from the flue gases. One of the first commercial systems involves scrubbing the flue gases with an aqueous solution which contains materials which will react with the sulfur oxides. The most commonly used materials are limestone and dolomite which may be added either to the furnace or directly to the scrubbing solution. However, unless specific measures are taken and very careful controls maintained on the system chemistry, sulfur oxide removal will not be maximized and precipitates can form in the scrubber and the system piping which tend to plug up the system and may eventually force shutdown.

SUMMARY OF THE INVENTION

The present invention relates to an air pollution control system and more specifically to a system in which the gases containing sulfur oxides are scrubbed with an aqueous solution containing alkaline earth metal carbonates whereby the sulfur oxides are reacted with the scrubbing solution to form $H_2SO_3$ which will ionize to sulfites and bisulfites. The invention involves the oxidation of a portion of the sulfites and bisulfites to sulfate in the scrubber system so as to irreversibly remove sulfite and bisulfite ions and drive the reactions toward more absorption of $SO_2$. The amount of oxidation in the scrubber system is controlled to keep the pH within limits so as not to overly increase the $SO_2$ vapor pressure and thereby reduce $SO_2$ absorption. The oxidation of the remaining sulfites and bisulfites to sulfate and the precipitation and removal of the sulfate is then carried out on the effluent stream from the scrubber system. Other features of the invention and the advantages will be apparent from the description which follows.

DESCRIPTION OF THE PREFERRED EMBODIMENTS

Figure 1:
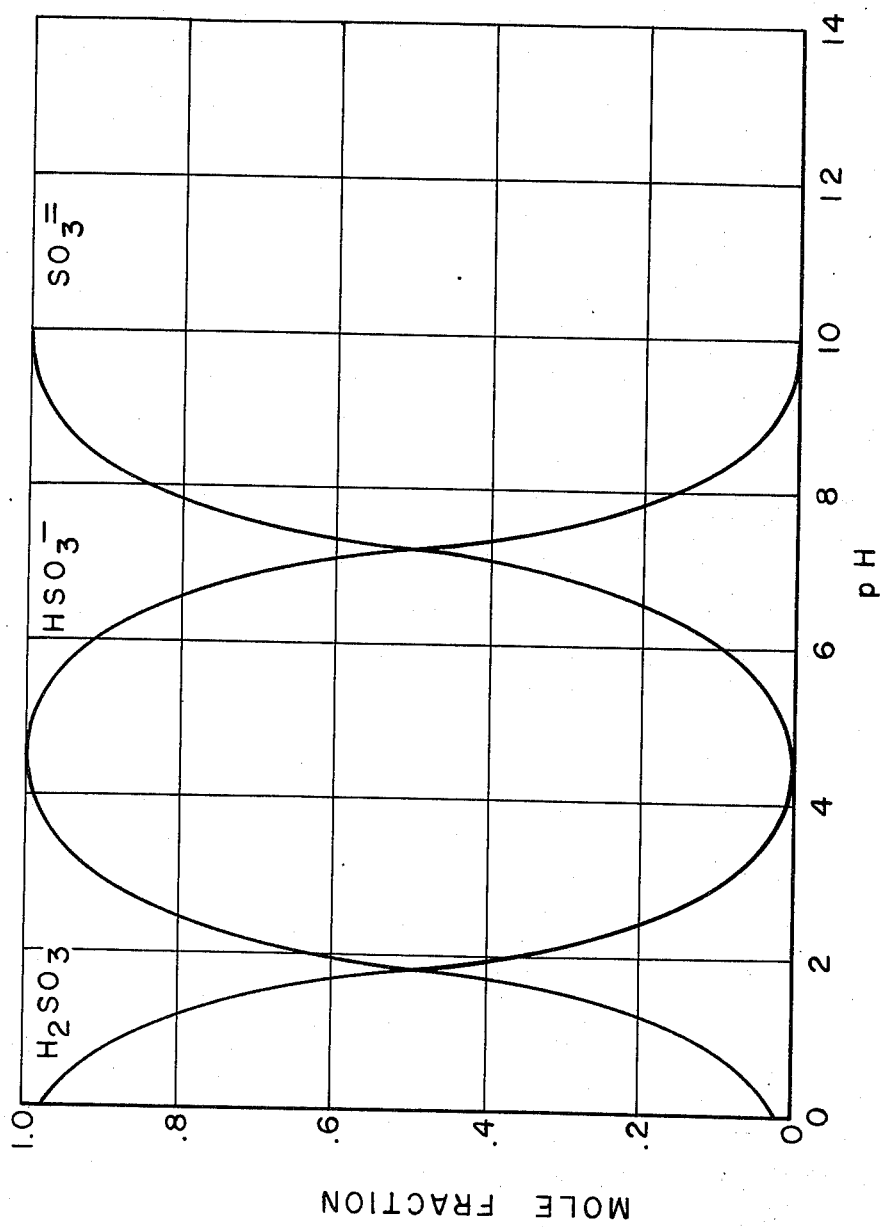
FIG. 1 is a graph illustrating the mole fraction of ions in solution as a function of pH for aqueous solutions containing $SO_2$ and related species.

The present invention involves the scrubbing of flue gases containing $SO_2$ with a scrubbing solution containing an alkaline earth metal carbonate additive such as calcium or magnesium carbonate. The reactions which take place in the scrubbing operation are as follows:

(1) $SO_2$ (g) $\rightleftarrows$ $SO_2$ (aq)
(2) $SO_2$ (aq) + $H_2O$ $\rightleftarrows$ $H_2SO_3$
(3) $H_2SO_3$ $\rightleftarrows$ $H^+ + HSO_3^-$
(4) $HSO_3^-$ $\rightleftarrows$ $H^+ + SO_3^=$ The function of the additive is to neutralize the $H^+$ ions which are formed by the absorption of $SO_2$ as in equations (3) and (4) according to the following reaction:

(5) $CaCO_3$ (solid) + $H^+$ $\rightleftarrows$ $Ca^{++} + HCO_3^-$

The $HCO_3^-$ then reacts with $H_2SO_3$ as follows:

(6) $HCO_3^- + H_2SO_3$ $\rightleftarrows$ $HSO_3^- + CO_2$

The amount of $CO_2$ which will remain in solution is a function of the percentage of $CO_2$ in the flue gas, which is normally 13 to 15%, and the pH of the scrubbing medium.

Since the above reactions are reversible, the irreversible removal of sulfite and bisulfite ions from the solution will drive the reactions in a direction which causes more absorption of $SO_2$. Sulfite and bisulfite ions can be removed by oxidizing the sulfite ions to sulfate ions. However, the oxidation product is essentially sulfuric acid which causes the pH to drop. A drop in pH causes an increase in the vapor pressure of $SO_2$ resulting in a decrease in the absorption of $SO_2$. This can be seen from FIG. 1 by the fact that a drop in pH below about 4.5 increases the fraction of $H_2SO_3$ in the solution and thus the vapor pressure of $SO_2$ which is in equilibrium therewith. There are therefore two competing factors which determine the $SO_2$ removal efficiency in the scrubber.

In the present invention the $SO_3^=$ ions are partially oxidized to $SO_4^=$ ions in the scrubber thereby removing $SO_3^=$ ions and driving the $SO_2$ absorption reactions towards the right. The amount of $SO_3^=$ which oxidizes to $SO_4^=$ is controlled so as to maintain the pH at a level such that the $SO_2$ vapor pressure will not be increased.

The removal of some of the $SO_3^=$ ions from solution by oxidation to $SO_4^=$ ions also has another beneficial effect on the operation of the system. One of the problems which is frequently encountered in $SO_2$ absorption systems is the scaling of equipment with sulfates and sulfites unless conditions are very carefully controlled. The removal of some of the $SO_3^=$ ions from the solution in the scrubber reduces the possibility of sulfite precipitation and scaling. It is also known that the solution may be significantly supersaturated with sulfate ions without any precipitation taking place unless $CaSO_4$ seed crystals are present. For example, $CaSO_4$ has a solubility of about 2000 ppm. But a supersaturated solution is metastable up to 3000 to 4000 ppm. The rate of precipitation of $CaSO_4$ from a supersaturated solution is a function of the number of $CaSO_4$ seed crystals which are available. The manner in which this phenomenon is employed in the process will be more fully explained hereinafter.

Figure 2:
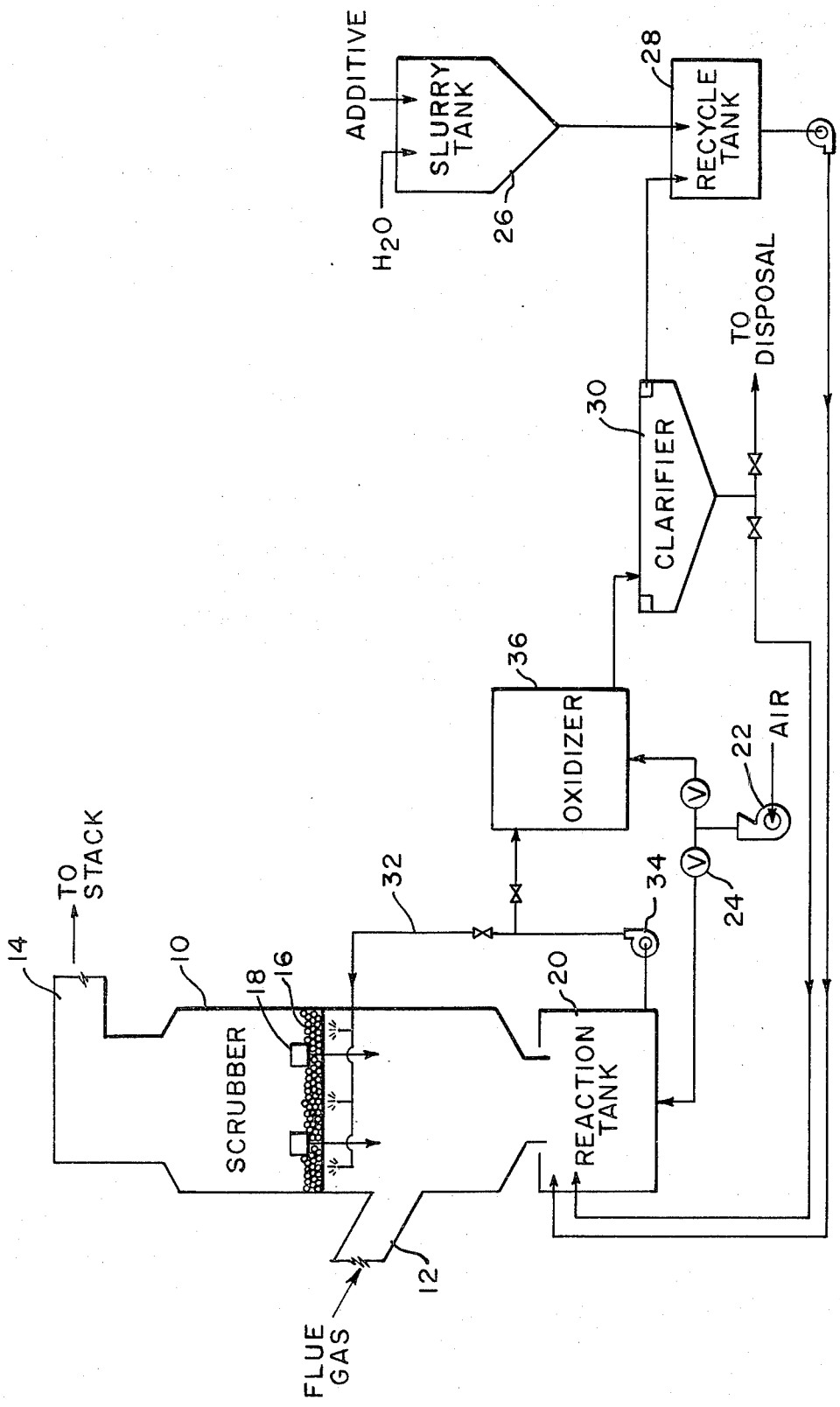
FIG. 2 is a flow diagram illustrating the present invention.
Figure 3:
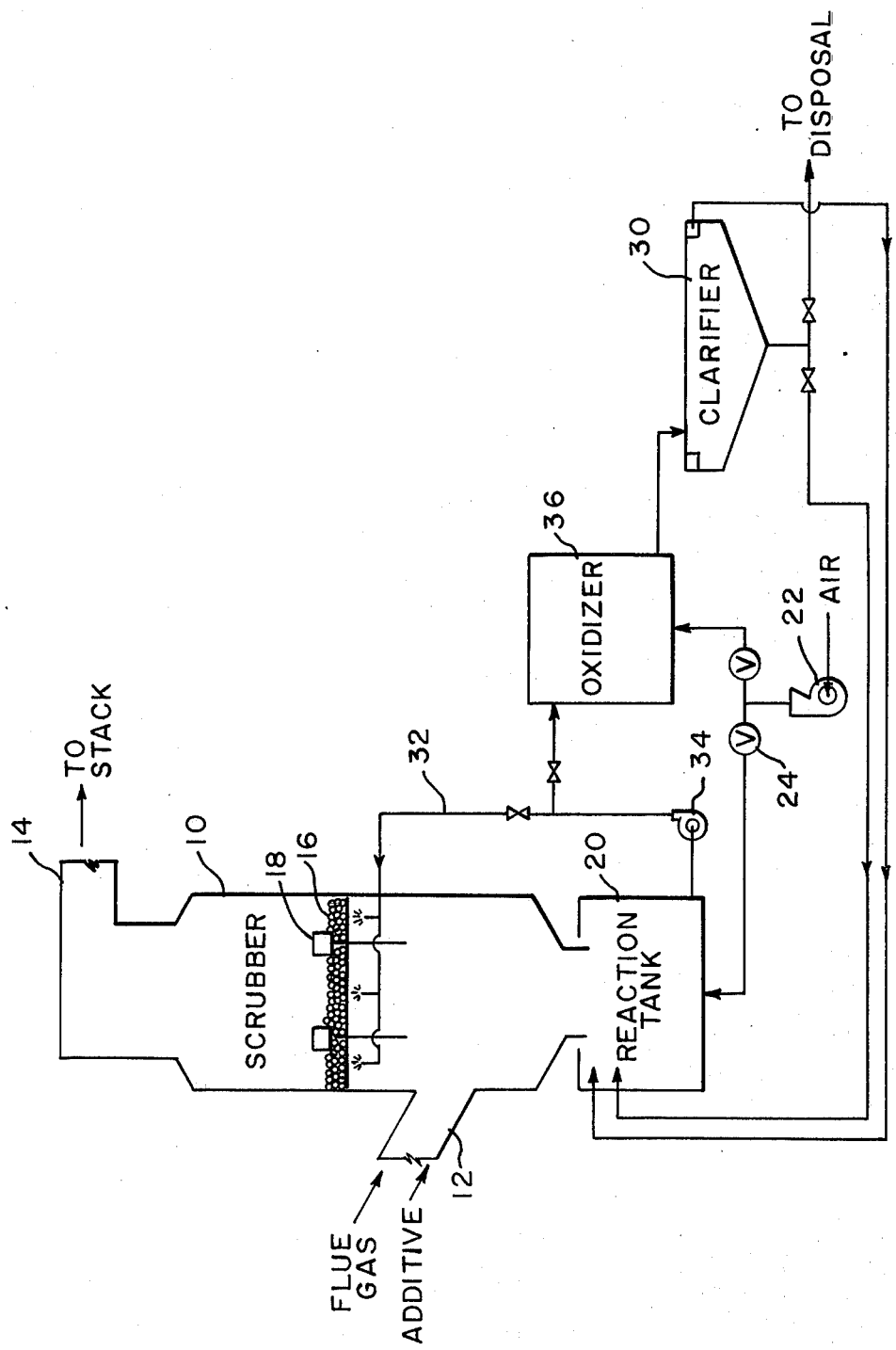
FIG. 3 is a flow diagram which illustrates a modification of the present invention.

Referring to FIG. 2, the flue gases containing $SO_2$ enter the scrubber 10 through duct 12 and the cleaned gases exit through duct 14. The scrubber 10 may be of the marble bed type as illustrated or any other suitable scrubber for liquid-gas contact. The scrubbing medium is sprayed into the gas stream below the scrubber bed 16. The scrubbing medium, which has a pH of about 6.0 to 6.5, is a slurry of $CaCO_3$ which is saturated with $CaSO_4$ and which also contains seed crystals of $CaSO_4$.

The SO₂ reacts with the scrubbing medium to produce $SO_3^=$ and $HSO_3^-$ ions which lower the pH to about 5.5. Also, oxygen in the form of air, which has been introduced into the reaction tank 20 as will be explained hereinafter, flows up into the scrubber and causes some oxidation to occur in the scrubber further reducing the pH to about 4.5 according to reaction (7).

(7) $SO_3^= + \frac{1}{2} O_2 \rightarrow SO_4^=$

By controlling the amount of oxygen introduced into the reaction tank 20 by the blower 22 with damper 24, the percentage of $SO_3^=$ oxidized to $SO_4^=$ in the scrubber can be controlled. The amount of oxidation is controlled such that about 30 to 50% of the $SO_3^=$ is converted to $SO_4^=$. This results in an increase in the ratio of $SO_4^=$ to $SO_3^=$ in the scrubber and, as can be seen from equations (1) to (4), this will cause all of the reactions to proceed to the right meaning that the absorption of SO₂ will be increased. Limiting the amount of oxidation prevents a shift in the equilibrium towards the formation of H₂SO₃, as shown in FIG. 1, to prevent an increase in SO₂ vapor pressure and thus less SO₂ absorption.

The scrubbing medium then flows down through the overflow pots 18 to the reaction tank 20. Here the air is introduced for additional oxidation of sulfites to sulfates. This would cause a drop in pH. However, fresh additive carbonate such as CaCO₃ is introduced into the slurry tank 26 together with water. The CaCO₃ slurry from tank 26 is fed into the recycle tank 28 together with the overflow from the clarifier 30. The slurry from the recycle tank 28 is then fed to the reaction tank 20 and mixed with the scrubber effluent. The amount of fresh additive introduced into the system is adjusted to replace the amount of calcium being discharged from the system. The additive causes the pH to be increased to about 6.0 to 6.5. The oxidation of sulfites to sulfates together with the dissolution of the additive causes an increase in the concentration of CaSO₄ which will precipitate in the reaction tank 20 if seed crystals are present.

As indicated, the slurry from the reaction tank 20 is pumped by means of the pump 34 through the recycle line 32 and is sprayed into the scrubber underneath the bed 16. This recycle slurry will contain solid CaCO₃, will be saturated with dissolved CaSO₄ and will also contain solid CaSO₄ as seed crystals.

Crystallization from supersaturated solutions can occur by two processes, formation of new crystals or nucleation and growth of existing crystals. The internal surfaces of the scrubber can provide nucleation sites thus resulting in scale formation. However, if sufficient seed crystals are provided, the crystallization will take place on these existing crystals rather than on the surfaces of the scrubber. The circulation of 1 to 5 percent seed crystals can be effective to cause desupersaturation. However, the residence time of the scrubbing medium in the scrubber 10 is relatively small so that there is very little desupersaturation and crystallization in the scrubber. The reaction tank 20 provides the residence time necessary to carry out this desupersaturation phenomenon and thus prevent sulfate scaling.

A portion of the slurry from the reaction tank 20 is pumped to the oxidizer 36. Oxygen is introduced into the oxidizer 36 from the blower 22 to oxidize the residual $SO_3^=$ to $SO_4^=$ according to reaction (7). This oxidation process is carried out such that substantially all of the $SO_3^=$ entering the oxidizer 36 is oxidized to $SO_4^=$. Some residual additive will also dissolve. The seed crystals cause this $SO_4^=$ to precipitate as CaSO₄. The effluent stream from the oxidizer 36 is then introduced into the clarifier 30 in which the precipitates, which are now almost all CaSO₄, will settle from the liquid. The liquid is then skimmed off and recycled to the system through the recycle tank 28. The sludge from the clarifier 30 may then be disposed of as desired. Also, a portion of this CaSO₄-containing sludge may be recycled to the scrubber system to provide seed crystals as necessary particularly during the startup of the system.

The invention is also applicable to flue gas scrubbing systems in which the additive is introduced into the furnace. Such systems are described, for example, in U.S. Pat. Nos. 3,320,906; 3,637,347 and 3,726,239. In these systems the carbonate additive is calcined to the oxide form in the furnace. The oxide formed by this furnace calcining process is a relatively slow dissolving, slow reacting form of the oxide as opposed to what is commonly referred to as quicklime which is a relatively fast dissolving, reactive form produced by roasting or calcining in a kiln under carefully controlled conditions. Therefore, the oxide will not greatly increase the pH as would quicklime and the additive serves the same function as the carbonate additives which are introduced directly into the scrubber, i.e. the neutralization of the H⁺ ions which are formed by the absorption of SO₂ according to the following equation:

(8) $CaO + H^+ \rightleftarrows Ca^{++} + OH^-$

The OH⁻ ions in turn react with other H⁺ ions to form water.

The primary advantage of the present invention is that the partial oxidation of the sulfites and bisulfites in the reaction tank prior to recycling the slurry to the scrubber reduces the percentage of sulfites and bisulfites in the scrubber system. This also reduces the amount of H₂SO₃ in solution thereby increasing the SO₃ removal efficiency of the scrubber. A byproduct of the invention is that the reduction in the amount of sulfites and bisulfites in the scrubber reduces the possibility of sulfite scaling while the production of CaSO₄ seed crystals reduces sulfate scaling. The final oxidation of the sulfites to sulfates provides a uniform byproduct and also reduces the chemical oxygen demand from the waste streams.

It should be pointed out that the invention, although it has been described with reference to calcium compounds, is also applicable to magnesium compounds and mixtures of calcium and magnesium compounds such as in dolomite.

What is claimed is:

1. A method of removing SO₂ from a flue gas stream from a furnace comprising the steps of:
   a. contacting said flue gas in a scrubbing zone of a scrubber with an aqueous scrubbing medium containing solid alkaline earth metal carbonate, seed crystals of alkaline earth metal sulfate and dissolved alkaline earth metal carbonate and sulfate and having a pH of from 6.0 to 6.5 whereby said SO₂ reacts with said aqueous scrubbing medium to form sulfites and bisulfites;
   b. contacting an oxygen-containing gas with said aqueous scrubbing medium in said scrubbing zone, the amount of said oxygen being such that said oxygen reacts with only a portion of said sulfite to form sulfate thereby reducing the pH to 4.5;

c. withdrawing said aqueous scrubbing medium from said scrubbing zone;

d. contacting an oxygen-containing gas with said withdrawn aqueous scrubbing medium and introducing into said withdrawn aqueous scrubbing medium an additive material selected from the group consisting of alkaline earth metal carbonate and an alkaline earth metal oxide formed by calcining alkaline earth metal carbonate in said furnace, the amount of said additive material being selected to replace the amount of precipitated alkaline earth metals separated in step (g) and the amount of said oxygen-containing gas being such that said oxygen reacts with only a portion of the remaining sulfite to form sulfate and whereby the pH is maintained from 6.0 to 6.5;

e. recycling a portion of said aqueous scrubbing medium from step (d) to step (a);

f. contacting an oxygen-containing gas with the remaining portion of said aqueous scrubbing medium from step (d) to convert substantially all of the remaining sulfite to sulfate;

g. separating precipitated alkaline earth metal sulfate from said oxidized remaining portion of said aqueous medium from step (f); and h. recycling said aqueous scrubbing medium from step (g) to step (d).

2. A method as recited in claim 1 wherein said steps (b) and (d) of contacting an oxygen-containing gas with said aqueous scrubbing medium in said scrubbing zone and with said withdrawn aqueous scrubbing medium comprise the steps of passing said oxygen-containing gas serially through said withdrawn aqueous scrubbing medium and then through said aqueous scrubbing medium in said scrubbing zone.

3. A method as recited in claim 2 wherein said step of introducing said additive material into said withdrawn aqueous scrubbing medium comprises the step of introducing said alkaline earth metal oxide with said flue gas into said scrubber.

4. A method as recited in claim 2 wherein said step of introducing said additive material into said withdrawn aqueous scrubbing medium comprises the steps of forming a slurry of alkaline earth metal carbonate and water and introducing said slurry into said withdrawn aqueous scrubbing medium.

5. A method as recited in claim 2 and further including the step of recycling a portion of said precipitated sulfate from step (g) to step (d) as seed crystals to aid in the precipitation of sulfate.

6. A method as recited in claim 2 wherein said portion of sulfite oxidized to sulfate in step (b) comprises from 30 to 50% of the sulfite present in said aqueous scrubbing medium.

7. A method as recited in claim 2 wherein said alkaline earth metal carbonate comprises a material selected from the group consisting of calcium carbonate, magnesium carbonate and mixture thereof.

* * * * *